United States Patent
Guven et al.

(10) Patent No.: US 7,146,263 B2
(45) Date of Patent: Dec. 5, 2006

(54) PREDICTIVE LOAD MANAGEMENT SYSTEM

(75) Inventors: Mustafa K. Guven, Dunlap, IL (US); Brian D. Kuras, Metamora, IL (US); Michael E. Vanderham, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 32 days.

(21) Appl. No.: 10/673,486

(22) Filed: Sep. 30, 2003

(65) Prior Publication Data

US 2005/0071067 A1    Mar. 31, 2005

(51) Int. Cl.
G06F 17/00 (2006.01)
G06F 19/00 (2006.01)

(52) U.S. Cl. ............ 701/54; 701/61; 701/50; 701/95; 477/97; 477/110; 60/451

(58) Field of Classification Search .......... 701/54, 701/61, 50, 95, 93, 62; 477/197, 110, 90, 477/115; 60/431, 445, 448, 449, 451
See application file for complete search history.

(56) References Cited

U.S. PATENT DOCUMENTS

| | | | |
|---|---|---|---|
| 3,628,330 A | 12/1971 | Miller | |
| 4,080,850 A | 3/1978 | Bubula et al. | |
| 4,191,270 A | 3/1980 | Monteith | |
| 4,263,997 A * | 4/1981 | Poore | 192/103 R |
| 4,474,104 A | 10/1984 | Creffield | |
| 4,523,892 A | 6/1985 | Mitchell et al. | |
| 4,534,707 A | 8/1985 | Mitchell | |
| 4,542,802 A * | 9/1985 | Garvey et al. | 180/306 |
| 5,070,695 A | 12/1991 | Metzner | |
| 5,184,466 A | 2/1993 | Schniederjan et al. | |
| 5,257,193 A * | 10/1993 | Kusaka et al. | 701/110 |
| 5,341,311 A | 8/1994 | Liebler | |
| 5,406,483 A * | 4/1995 | Kallis et al. | 701/53 |
| 5,435,131 A | 7/1995 | Hausman et al. | |
| 5,468,126 A * | 11/1995 | Lukich | 417/53 |
| 5,525,043 A * | 6/1996 | Lukich | 417/218 |
| 5,868,214 A * | 2/1999 | Workman | 180/179 |
| 6,267,707 B1 * | 7/2001 | Bock | 477/109 |
| 6,308,124 B1 * | 10/2001 | Kresse et al. | 701/53 |
| 6,308,516 B1 * | 10/2001 | Kamada | 60/450 |
| 6,314,727 B1 * | 11/2001 | Prabhu et al. | 60/431 |
| 6,347,680 B1 * | 2/2002 | Mianzo et al. | 180/197 |
| 6,385,970 B1 | 5/2002 | Kuras et al. | 60/448 |
| 6,424,902 B1 | 7/2002 | Kuras | 701/51 |

(Continued)

FOREIGN PATENT DOCUMENTS

JP    61-169629    7/1986

(Continued)

*Primary Examiner*—Thomas Black
*Assistant Examiner*—Brian J. Broadhead
(74) *Attorney, Agent, or Firm*—Finnegan,Henderson, Farabow,Garrett&Dunner

(57) ABSTRACT

A predictive load management system is provided. A power source is operable to generate a power output and has a desired operating range. A transmission has a drive member operably engaged with the power source and a driven member. A control system is operable to receive at least one input indicative of a load on the transmission and to identify a desired load of the transmission based on the at least one input. The control system is also operable to receive at least one input indicative of current power output of the power source. The control system limits the desired transmission load applied to the driven member of the transmission based on the current power output of the power source to thereby prevent the power source from operating outside of the desired operating range.

17 Claims, 3 Drawing Sheets

U.S. PATENT DOCUMENTS

| | | | |
|---|---|---|---|
| 6,427,110 B1 * | 7/2002 | Manken et al. | 701/93 |
| 6,436,005 B1 * | 8/2002 | Bellinger | 477/111 |
| 6,440,038 B1 * | 8/2002 | Holloway | 477/54 |
| 6,459,979 B1 * | 10/2002 | Murakami | 701/54 |
| 6,574,541 B1 * | 6/2003 | Katakura et al. | 701/54 |
| 6,574,543 B1 * | 6/2003 | Ikeda | 701/95 |
| 6,672,055 B1 * | 1/2004 | Konishi et al. | 60/449 |
| 6,684,145 B1 * | 1/2004 | Gianoglio et al. | 701/54 |
| 6,685,597 B1 * | 2/2004 | Satou et al. | 477/158 |
| 2001/0004619 A1 * | 6/2001 | Schleicher et al. | 477/107 |
| 2002/0123836 A1 * | 9/2002 | Komiyama et al. | 701/51 |
| 2003/0144784 A1 * | 7/2003 | Tashiro et al. | 701/54 |
| 2004/0128047 A1 * | 7/2004 | Graves et al. | 701/54 |

FOREIGN PATENT DOCUMENTS

| | | |
|---|---|---|
| JP | 1110884 | 4/1989 |
| JP | 04-181063 | 6/1992 |
| JP | 04-203672 | 7/1992 |
| JP | 06-050424 | 2/1994 |

* cited by examiner

PREDICTIVE LOAD MANAGEMENT SYSTEM

TECHNICAL FIELD

This invention relates generally to a load management system and, more particularly, to a system and method for predictive load management.

BACKGROUND

Work machines such as, for example, wheel loaders, track type tractors, and other types of heavy machinery are used for a variety of tasks. These work machines include a power source, which may be, for example, an engine, such as a diesel engine, gasoline engine, or natural gas engine that provides the power required to complete these tasks. To efficiently perform these tasks, the work machines require a transmission that is capable of transmitting the torque generated by the engine over a wide range of speeds.

Typically, work machines use a continuously variable transmission (CVT) to convert engine torque to drive traction devices, such as wheels or tracks that propel the work machine. Continuously variable transmissions are capable of providing a desired output torque at any speed within its operating range by continuously changing the ratio of the transmission.

When an increase in torque is required at the same or faster output speed than previously demanded, a power increase demand is placed on the engine. Similarly, when less torque is required at the same or slower speed, a power decrease demand is transmitted to the engine. A change in the engine power demand is traditionally countered by an increase or decrease in fuel delivery to the engine. However, due to response delays of the various engine systems and the immediate demand for a change in power, engine speed may either droop under or over shoot a desired engine speed.

A problem common to many known CVT systems is that operation of these devices may produce loads on the engine that are severe enough to cause engine "stalling" or "lugging", a.k.a., excessive engine speed droop. "Lugging" or "stalling" the engine may decrease the productivity and efficiency of the engine. Such CVT systems may also become unstable because the time required for the engine to respond to the changes in power demand can be much greater than the demand period.

Traditionally, power systems including an engine and a continuously variable transmission are controlled by measuring engine speed and changing the ratio of the transmission to keep the engine within a defined speed range. For example, U.S. Pat. No. 6,385,970 to Kuras et al. discloses a system that includes an engine, a hydraulic continuously variable transmission, and a control system in communication with the engine and transmission. The control system of the '970 patent is an underspeed control system for a hydro-mechanical drive system that is operable to sense engine speed and create an output speed signal. The control system is further operable to compare the engine speed signal to an underspeed value and produce an error signal. The error signal is used to produce a command signal that controls the transmission ratio to manage the load on the engine.

However, this type of control system may not prevent the engine from experiencing the inefficiencies associated with engine overspeed or underspeed conditions. Because the control system attempts to maintain the desired engine speed by measuring a deviation of the actual speed from a desired speed, the actual engine speed may not match the desired engine speed. By the time the control system determines that the engine speed has deviated from the desired speed, the engine has already experienced these inefficiencies, even if the transmission adjusts the ratio to help the engine recover.

The present invention is directed towards overcoming one or more of the problems as set forth above.

SUMMARY OF THE INVENTION

In accordance with one aspect of the invention, a predictive load management system includes a power source operable to generate a power output and having a desired operating range. The predictive load management system further includes a transmission having a drive member operably connected with the power source and a driven member. The predictive load management system also includes a control system in communication with the power source and the transmission. The control system is operable to receive at least one input indicative of a load on the transmission and to identify a desired load of the transmission based on the at least one input. The control system is further operable to receive at least one input indicative of a current power output of the power source. The control system is operable to limit the desired transmission load applied to the driven member of the transmission based on the current power output of the power source to thereby prevent the power source from operating outside of the desired operating range.

According to another aspect, the present invention is directed toward a method of managing a predicted load on a transmission. A power source having a desired operating range drives the transmission. A current power output of the power source is estimated. A desired load of the transmission is identified. The desired load applied 10 a driven member of the transmission is limited based on the estimate of the current power output of the power source to thereby prevent the power source from operating outside of the desired operating range.

DETAILED DESCRIPTION

Figure 1:
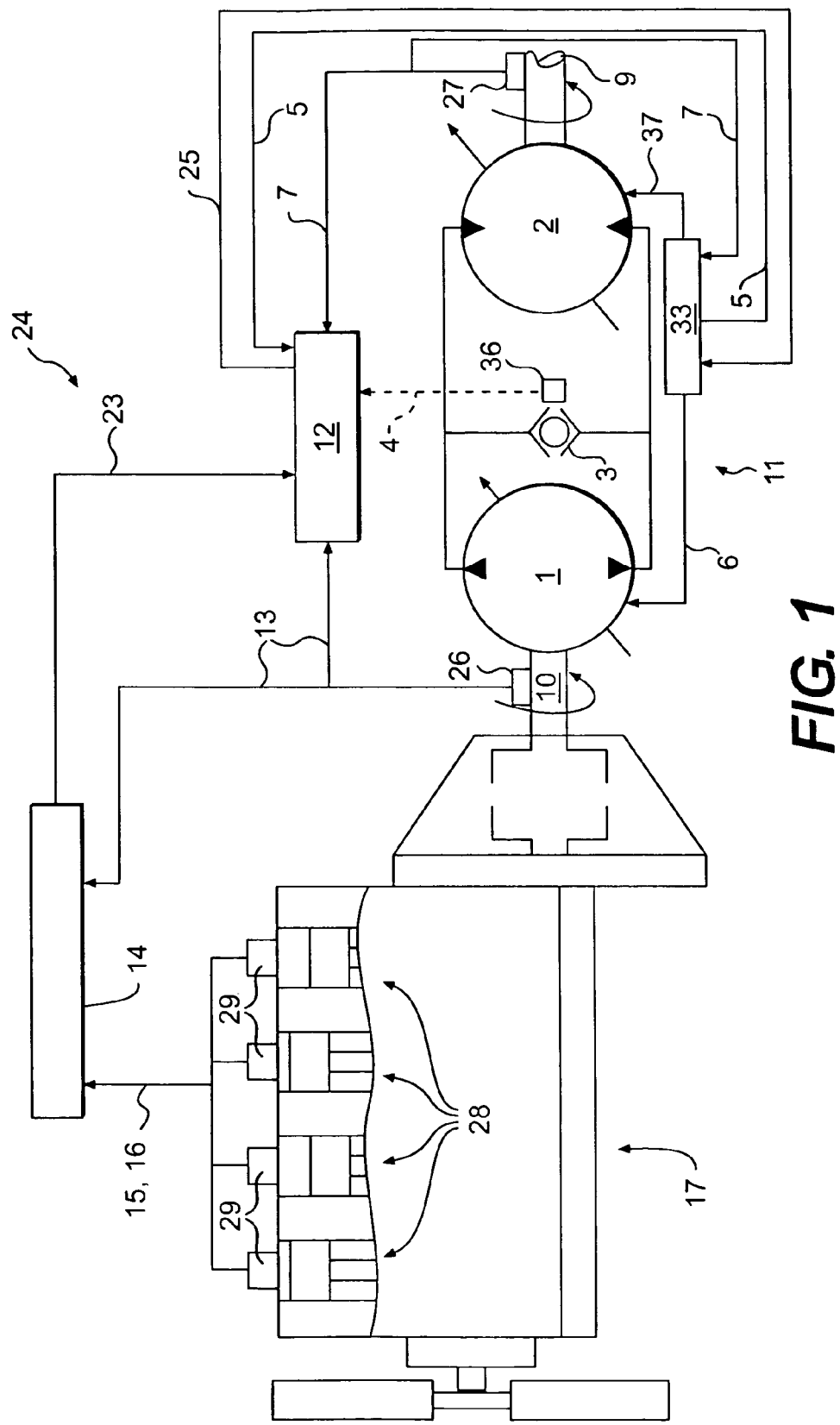
FIG. 1 is a schematic and diagrammatic illustration of an exemplary embodiment of a predictive load management system.
Figure 2:
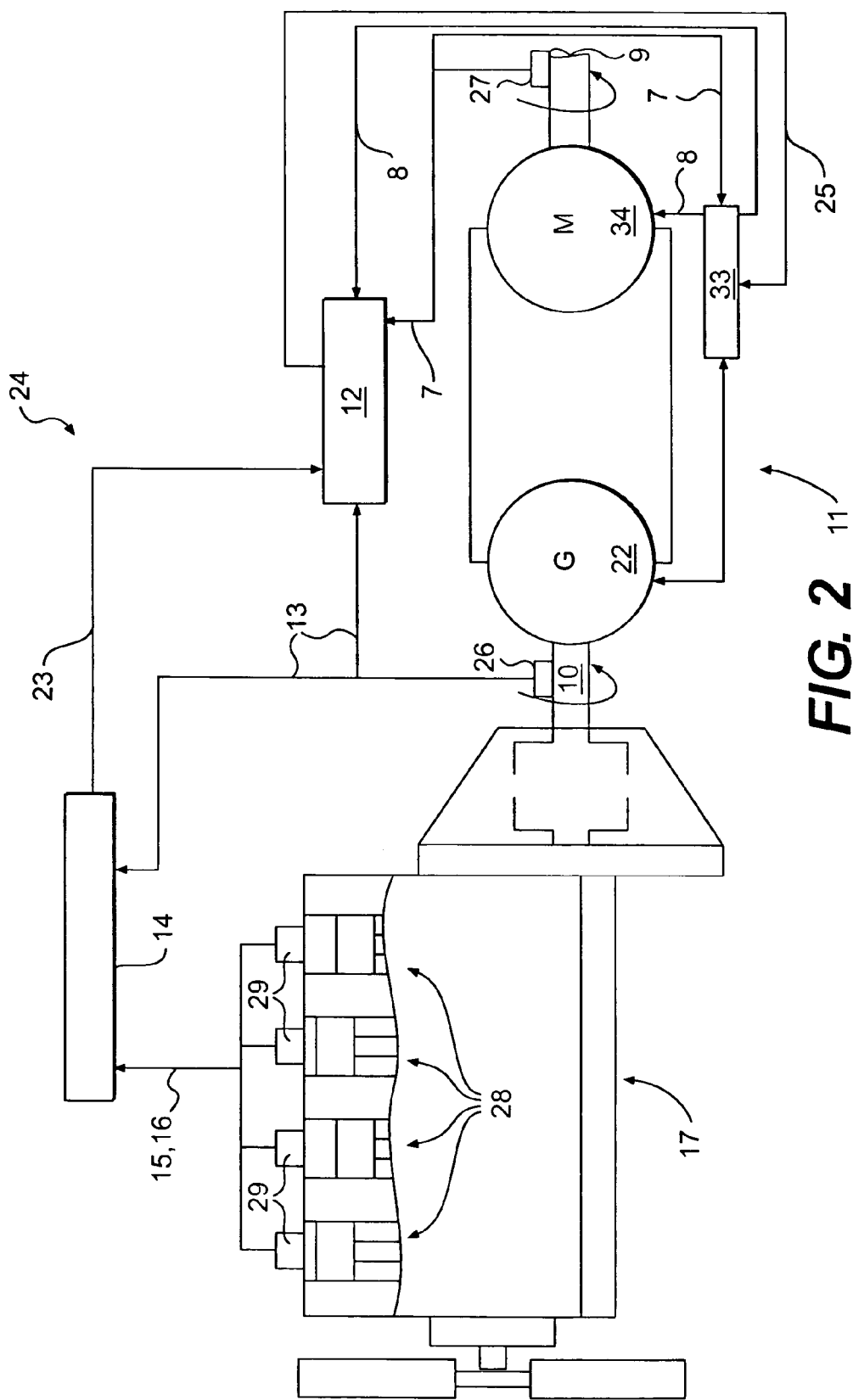
FIG. 2 is a schematic and diagrammatic illustration of an exemplary embodiment of a predictive load management system.

Exemplary embodiments of a predictive load management system are illustrated in FIGS. 1 and 2. The predictive load management system may be used, for example, with a power source 17 and a transmission 11. In the embodiments of FIGS. 1 and 2, power source 17 is an engine, such as an internal combustion engine. The engine may be a diesel engine, a gasoline engine, a natural gas engine, or any other engine readily apparent to one skilled in the art. It is contemplated that the predictive load management system may be used with other types of power sources such as, for example, fuel cells.

As illustrated in FIG. 1, the power source 17 includes a plurality of combustion chambers 28. A fuel injector 29 is associated with each combustion chamber 28. In the illustrated embodiment, the power source 17 includes four combustion chambers 28 and four associated fuel injectors 29. One skilled in the art will readily recognize that power source 17 may include a greater or lesser number of combustion chambers 28 and that combustion chambers 28 may be disposed in an "in-line" configuration, a "V" configuration, or any other conventional configuration.

The power source 17 may have a desired operating range. For the purposes of this disclosure, the term "desired operating range" includes those speeds and torques at which the power source 17 experiences substantially stable and efficient operation. When operating outside the desired operating range, the power source 17 may experience unstable operation such as, for example, overspeed situations, underspeed situations, lugging, and/or stalling. Efficiency losses may also be experienced by the power source 17 when operating outside the desired operating range such as, for example, increased fuel consumption, increased exhaust emissions, increased power source temperatures, and/or decreased responsiveness.

In conventional systems, the time required for the engine 17 to react to a transfer of load from the transmission 11 to the engine 17 may result in the engine 17 experiencing unstable operation. The system of the present disclosure is adapted to decrease the amount of time required to react to the transfer of load and thereby avoid the unstable operation. In this manner, the system of the present disclosure operates in advance of the reaction time of a conventional system.

An input drive member such as, for example, a countershaft 10 may connect the power source 17 to the transmission 11. The transmission 11 may also include an output driven member such as, for example, an output shaft 9. As described in greater detail below, the transmission 11 converts an input rotation of countershaft 10 into an output rotation of output shaft 9. In this manner, power generated by the power source 17 may be transmitted to the output shaft 9.

The transmission 11 may be, for example, a continuously variable transmission. The transmission 11 may be any type of continuously variable transmission such as, for example, a hydraulic continuously variable transmission (as shown in FIG. 1), an electric continuously variable transmission (as shown in FIG. 2), or other configurations as would be apparent to one skilled in the art.

A continuously variable transmission generally consists of a driving element, a driven element, and a ratio controller 33. In the hydraulic continuously variable transmission 11 illustrated in FIG. 1, the driving element is a pump 1, such as a variable displacement pump, and the driven element is a motor 2, such as a variable displacement motor. In the electric continuously variable transmission 11 illustrated in FIG. 2, the driving element is an electric generator 22 and the driven element is an electric motor 34.

In the hydraulic continuously variable transmission 11 of FIG. 1, the ratio controller 33 may manipulate the displacement of the pump 1 with a pump signal 6 and the motor 2 with a motor command signal 37 to thereby control the output rotation of output shaft 9. The motor 2 may be fluidly connected to the pump 1 by conduits that supply and return fluid to and from the pump 1 and motor 2, allowing the pump 1 to effectively drive the motor 2 by fluid pressure. The transmission 11 may also include a resolver 3, allowing for a measurement of a pressure differential between the two conduits of supply and return fluid. The pressure differential between the two conduits and/or the displacement of the motor 2 may be used to determine the transmission output torque.

The electric continuously variable transmission 11 of FIG. 2 may include an electrical circuit connecting the generator 22 to the electric motor 34. The generator 22 may be operated to drive the electric motor 34. The generator 22 and the electric motor 34 may be in communication via the ratio controller 33.

The ratio controller 33 controls the ratio of the transmission output speed to the transmission input speed. In the embodiments of FIGS. 1 and 2, the ratio controller 33 is in communication with both the driving element and the driven element and may adjust the ratio of the transmission output speed to the transmission input speed, as limited by the current power output of the power source 17. When both output torque and output speed increases are demanded of the transmission 11, a demand for increased power is transmitted to the power source 17. Likewise, when both output torque and output speed decreases are demanded of the transmission 11, a demand for decreased power is transmitted to the power source 17.

The ratio of transmission output speed to input speed of the hydraulic transmission 11 (as shown in FIG. 1) at a particular power source output power may be controlled by manipulating the displacement of the pump 1 and motor 2. As the work machine encounters a change in loading conditions such as, for example, changing from a high ground speed with a low load situation to a suddenly high load situation, the ratio controller 33 may shift the ratio of the transmission 11 from a high speed output to a low speed output. When shifting from a high speed output to a low speed output, the ratio controller 33 may decrease the flow of fluid supplied to the motor 2 by decreasing the displacement of the pump 1 to reduce the torque load or power load of the power source 17. The ratio controller 33 may also increase the displacement of the motor 2 to decrease the load on the power source 17. If the work machine encounters a reduction in load, the ratio controller 33 may increase the displacement of the pump 1 and may decrease the displacement of the motor 2. The increased displacement of the pump 1 combined with the decreased displacement of the motor 2 results in an increase in work machine ground speed and a reduction in the available torque.

The ratio of transmission output speed to input speed of the electric transmission 11 (as shown in FIG. 2) at a particular power source output power may be controlled by manipulating a torque command signal 8 to the electric motor 34. As the work machine encounters a change in loading conditions such as, for example, changing from a high ground speed with a low load situation to a suddenly high load situation, the ratio controller 33 may alter the torque command signal 8 sent to the electric motor 34 to produce additional torque. In turn, the electric motor 34 demands additional power capacity from the generator 22 in the form of additional current.

One or more sensors may be associated with the transmission 11. These sensors may be adapted to provide indications as to the operation of the transmission 11. For example, in the hydraulic transmission 11 of FIG. 1, a pressure sensor 36 may be adapted to provide a fluid pressure signal 4 from the resolver 3.

In addition, one or more sensors may be associated with the power source 17. These sensors may be adapted to provide relevant indications of the operation of the power source 17 and transmission 11. For example, power source speed sensor 26 may be adapted to produce a power source speed signal 13 and a transmission speed sensor 27 adapted to produce a transmission speed signal 7. The speed sensors may be, for example, in the form of magnetic pick-up sensors adapted to produce signals corresponding to the rotational speeds of the countershaft 10 and the output shaft 9. These sensors may also be capable of determining the speed, angular position, and direction of rotation of the countershaft 10 and output shaft 9.

The predictive load management system may include a control system 24 that has a power source observer 14 embodied in a microprocessor and a transmission controller 12 embodied in a microprocessor. Numerous commercially available microprocessors can be adapted to perform the functions of the power source observer 14 and the transmission controller 12. It should be appreciated that the power source observer 14 and the transmission controller 12 could readily be embodied in one single microprocessor without departing from the scope of the exemplary embodiment.

The power source observer 14 may be adapted to monitor and/or to receive operating parameters indicative of current performance of the power source 17. For example, the power source observer 14 may receive the power source speed signal 13. In addition, the power source observer 14 may monitor the operation of the fuel injection system through a power source fuel setting signal 15 and a power source fuel injection timing signal 16.

The control system 24 may use the observed operating parameters and the received signals to estimate the current power output of the power source 17. The current power output of the power source 17 may be estimated based on the rotational speed of the countershaft 10 and the torque exerted on the countershaft 10. Equation 1 below provides an exemplary equation for estimating the output torque of the power source 17. The estimated torque may be sent to the transmission controller 12 in a torque estimate signal 23.

$$T_{PS} = a_0 + a_1 w_{PS} + a_2 t + a_3 r + a_4 W_{PS}^2 + a_5 t^2 + a_6 r^2 + a_7 r w_{PS}^2 + a_8 r t^2 + a_9 t r^2 a_{10} t^3 + a_{11} r^3 \quad (EQ.\ 1)$$

where:

$T_{PS}$ is the estimated current power source output torque;
$a_i$ is a coefficient;
$w_{PS}$ is the sensed power source speed;
r is the sensed fuel setting; and
t is the sensed fuel injection timing.

The transmission controller 12 may be adapted to monitor and/or receive operating parameters indicative of the load on the transmission. For example, in the embodiment of FIG. 1, the transmission controller 12 may be configured to receive inputs from the hydraulic transmission 11, including the transmission speed signal 7 from speed sensor 27, a pump and motor displacement signal 5 from ratio controller 33 and the fluid pressure signal 4 from pressure sensor 36. The transmission controller 12 may calculate the torque exerted on countershaft 10 through any method known in the art such as, for example, by using the pump and motor displacement signal 5 and fluid pressure signal 4.

In the embodiment of FIG. 2, the transmission controller 12 may also be configured to receive inputs from the electric transmission 11. These inputs may include, for example, the torque command signal 8 from ratio controller 33 and the transmission speed signal 7 from transmission speed sensor 27. The torque command signal 8 from the ratio controller 33 to the electric motor 34 may be used to measure or estimate the electric motor output torque because of the consistent relationship of actual motor output versus command motor output. The torque command signal 8 may be used with the speed signal 7 to determine the electric motor output power. Other methods of measuring output torque may be implemented such as, for example, measuring motor input voltage and current, measuring generator output voltage and current, and other methods as are known in the art.

The control system 24 may limit the transmission load applied to the driven member of the transmission 11 when the load will result in the power source 17 operating outside of the desired operating range.

It is also contemplated that the rate at which the load is applied to the driven member of the transmission 11 may be limited. The control system 24 may limit the rate at which a desired change in transmission load is applied to the driven member of the transmission 11 when the change in load will result in the power source 17 operating outside of the desired operating range.

The control system 24 may determine if the current power output of the power source 17 is sufficient to meet the desired load of the transmission 11. Control system 24 may limit the load of the transmission 11 if the current power of the power source 17 is greater than a predetermined percent of the peak power of the power source 17. If the estimated power of the power source 17 is less than the predetermined percent of the peak power of the power source 17, the desired torque load of the transmission 11 will be limited to the peak power source power divided by the driven member speed. This limit is set to peak power to overcome the initial delays of the power source 17 producing power. This limit may, however, be determined through lab and/or field testing to be less than the peak power depending on the transient response of the power source 17.

Figure 3:
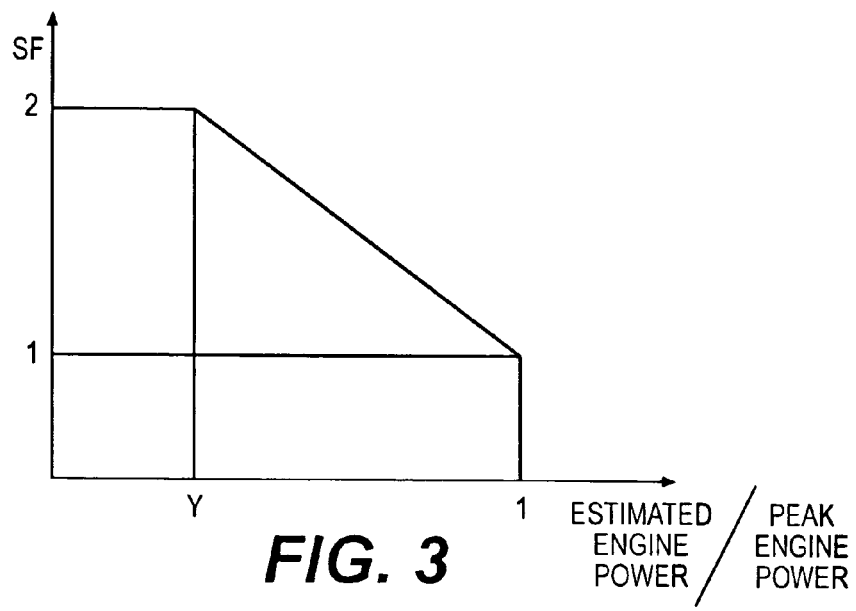
FIG. 3 is a graph illustrating a scaling factor relationship in an exemplary predictive load management system.

The control system 24 may, for example, limit the load of the transmission 11 based on a scaling factor determined according to FIG. 3. The scaling factor relates the estimated power output of the power source 17 to acceptable power source speed droop or overspeed. The scaling factor determines the appropriate load limit that the transmission can request from the power source. The relationship between estimated power source output and the appropriate scaling factor may be determined through lab and/or field testing and stored as a look-up table in a memory associated with the transmission controller 12.

The control system 24 may use this scaling factor, the torque estimate signal 23, the power source speed signal 13 from the speed sensor 26, and the transmission speed signal 7 from the speed sensor 27 to create a motor command signal 25 that limits the transmission load. For example, equation 2 below may be used to calculate the motor command signal 25.

$$T_m = SF \frac{T_{PS} \times w_{PS}}{w_m}, \quad (Eq.\ 2)$$

wherein:

$T_m$ is the maximum torque limit for the transmission motor;
SF is a scaling factor representing acceptable power source speed deviation;
$T_{PS}$ is the estimated current power source output torque;
$w_{PS}$ is the sensed power source speed;
$w_m$ is the speed of the transmission motor.

Ratio controller 33 may receive the motor command signal 25 and apply the command to the transmission 11 to effect the transmission output torque load. In a hydraulic CVT, as in FIG. 1, ratio controller 33 may limit the displacement of the pump 1 and motor 2 to achieve the desired change. Other methods of achieving the desired limit of the load in a hydraulic CVT may include, for example, pressure relief systems, crossover release systems and other methods known in the art. In an electric CVT, as in FIG. 2, the ratio controller 33 may limit the torque command signal 8 to achieve the desired change.

Figure 4:
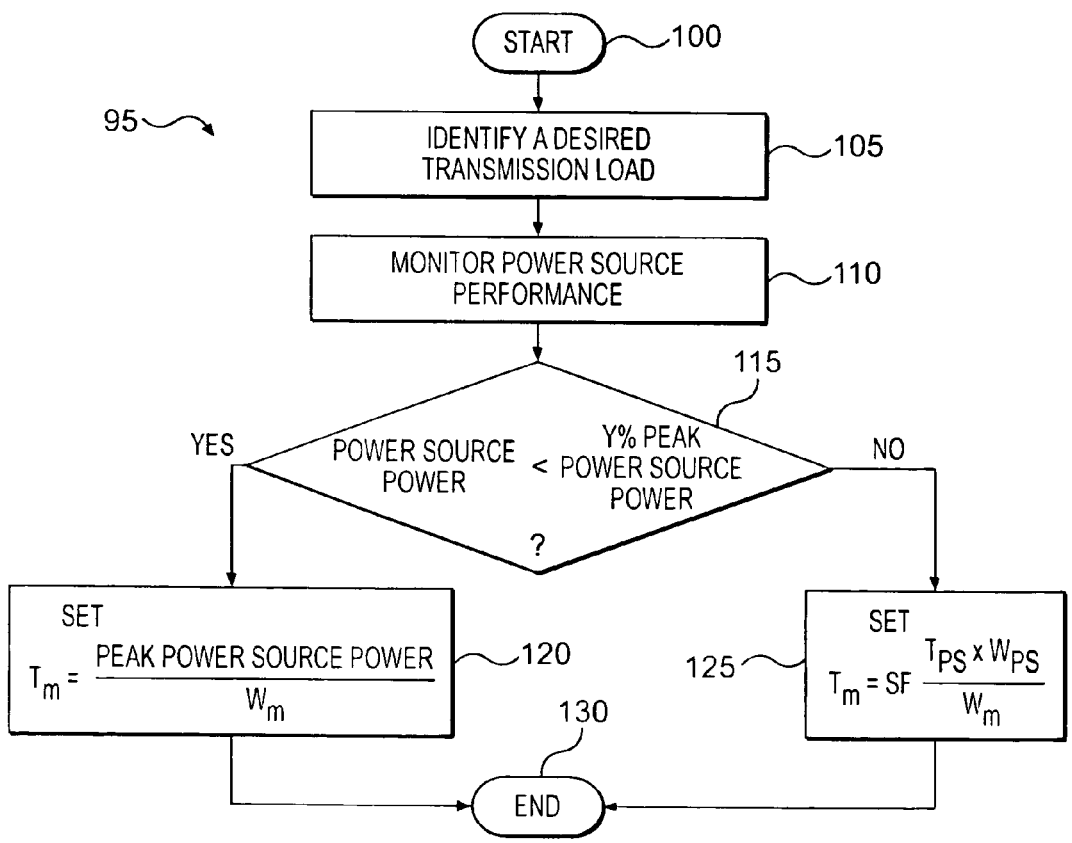
FIG. 4 is a flow chart illustrating an exemplary method of operating a predictive load management system.

A flow chart 95 illustrating an exemplary method for operating a predictive load management system is shown in FIG. 4 and is described in greater detail below. Control of the predictive load management system begins when the work machine is activated (step 100). The transmission controller determines the desired transmission load (step 105). Power source performance is monitored (step 110) and compared to a predetermined percent of the peak power source power level (step 115). If the current power source power is less than the predetermined percent of the peak power source power level, the limit applied to the motor command signal 25 is set to the peak power source power level (or a lower predetermine value) divided by the speed of the transmission motor (step 120). If the current power source power is greater than the predetermined percent of the peak power source power level, the limit applied to the torque command signal is set to the torque determined according to Eq. 2 above (step 125). When the torque command signal is sent to limit the desired load on the transmission, the cycle is complete (step 130).

INDUSTRIAL APPLICABILITY

The predictive load management system may determine a desired transmission load that under normal circumstances might cause the power source 17 to operate outside of a desired operating range resulting in power source inefficiencies and possibly leading to unstable operation. The predictive load management system described above may be operable to limit the desired transmission load applied to the driven member of the transmission 11, to thereby prevent the power source 17 from operating outside of a desired speed range.

In the exemplary method of FIG. 4, transmission controller 12 may identify a desired transmission load (step 105). In a hydraulic transmission, the desired load may be identified by sensing the pressure differential across the motor 2 of the fluid driving the motor 2 within the transmission 11 and comparing the pressure differential, a motor displacement value, and an output speed with reference pressure displacement, and speed values. In an electric continuously variable transmission, the desired load may be identified by sensing the motor command torque and comparing it to reference torque values.

The power source observer 14 may monitor and estimate the current power source power output (step 110). The power source observer 14 may monitor and/or receive current performance signals from the power source 17 including the fuel-setting signal 15, the fuel injection timing signal 16, and the power source speed signal 13. These signals may be used to estimate the current power source torque such as, for example, with equation 1 described above. Power source observer 14 may then generate the torque estimate signal 23 of the power source 17.

The torque estimate signal 23 of the power source may be used together with a scaling factor, determined according to established data such as in FIG. 3, and a transmission motor output speed in equation 2, described above, to calculate a limiting torque command based on an acceptable power source deviation from a desired operating range. Transmission controller 12 determines if the estimated power (estimated torque times the speed) of the power source is less than a predetermined percent of the peak power source power level (step 115). If the current power output is less than the predetermined percent, the motor command signal is set equal to the peak power (or a lesser predetermined value) of the power source divided by the speed of the transmission motor (step 120). Otherwise, the control system 24 calculates a motor torque limit according to equation 2 above (step 125).

Similarly, a desired decrease in transmission loading, as sensed in the transmission 11, may be communicated to the control system 24. The control system 24, in like manner as the desired increase in transmission load discussed previously may determine and send load limiting command signals to the transmission controller 12. However, with a decrease in torque load, the control system 24 sends a low limit, rather than a high limit. A low limit placed on the power source 17 may act to minimize an overspeed event.

The disclosed system has wide applications in a variety of work machines including, for example, wheel loaders and track-type tractors. The disclosed system may be implemented into any work machine having a housing and a traction device that utilizes a continuously variable transmission to convert rotational speed of a power source into a drive speed for the traction device. The present invention may increase the overall efficiency of the work machine by allowing the work machine to operate a greater percent of the time within a desired operating range. The control system may be implemented into an existing work machine without any major modifications or the addition of expensive hardware.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A predictive load management system, comprising:
   a power source operable to generate a power output, the power source having a desired operating range;
   a transmission including a drive member operably connected with the power source and a driven member; and
   a control system in communication with the power source and the transmission, wherein the control system is operable to:
      receive at least one input indicative of a load on the transmission, to identify a desired load of the transmission based on the at least one input;
      receive at least one input indicative of a current power output of the power source;
      limit desired transmission load applied to the driven member of the transmission based on the current power output of the power source to thereby prevent the power source from operating outside of the desired operating range;
      sense a transmission motor output speed; and
      determine a limiting motor command signal by comparing the current power source output power estimate with the current transmission output speed and a maximum acceptable speed droop or overspeed scaling factor.

2. The predictive load management system of claim 1, wherein the power source is a diesel engine.

3. The predictive load management system of claim 1, wherein the one or more inputs indicative of current power output of the power source include:

a power source speed signal;
a fuel setting signal; and
a fuel injection timing signal.

4. The predictive load management system of claim 1, wherein the transmission is a hydraulic continuously variable transmission including:
a variable displacement pump in communication with the control system;
a variable displacement motor fluidly connected to the variable displacement pump, the variable displacement motor being in communication with the control system; and
a sensor operably disposed between the variable displacement pump and the variable displacement motor, the sensor operable to detect a fluid pressure and to provide an indication of the fluid pressure to the control system.

5. The predictive load management system of claim 4, wherein the at least one input indicative of transmission loading includes at least one of:
a speed of the variable displacement motor;
a displacement of the variable displacement motor; and
a pressure of a fluid in the hydraulic transmission.

6. The predictive load management system of claim 1, wherein the transmission is an electric continuously variable transmission including:
a generator in communication with the control system; and
a motor in communication with the control system and with the generator.

7. The predictive load management system of claim 6, wherein the at least one input indicative of the load on the transmission includes:
a motor output speed; and
a transmission command torque signal as communicated between the control system and the motor.

8. The predictive load management system of claim 1, wherein the control system includes:
an observer in communication with the power source and operable to determine a current output torque estimate of the power source; and
a controller in communication with the transmission and operable to determine the desired load of the transmission and to limit the the desired load placed on the driven member of the transmission to prevent the power source from operating outside of the desired operating range.

9. The predictive load management system of claim 1, wherein the control system further includes:
a sensor adapted to determine a speed of the power source and to provide a signal indicative of the power source speed; and
a sensor adapted to determine an output speed of the transmission and provide a signal indicative of the transmission output speed.

10. A method of managing a predicted load on a transmission, comprising:
driving a transmission with a power source, the power source having a desired operating range;
estimating a current power output of the power source;
identifying a desired load on the transmission;
limiting the desired load applied to a driven member of the transmission based on the estimate of the current power output of the power source to prevent the power source from operating outside of the desired operating range;
sensing a transmission motor output speed; and
determining a limiting motor command signal by comparing the current power source output power estimate with the current transmission output speed and a maximum acceptable speed droop or overspeed scaling factor.

11. The method of claim 10, including:
sensing a speed of the power source;
sensing power source fuel settings; and
sensing a power source fuel injection timing.

12. The method of claim 10, further including sensing a transmission output torque.

13. The method of claim 10, further including:
sensing a transmission motor displacement; and
sensing a transmission fluid pressure.

14. The method of claim 10, further including communicating the limiting motor command signal to the driven member of the transmission when the estimated current power of the power source is greater than a predetermined percent of the peak power of the power source and communicating a motor command signal equal to the peak power of the power source divided by the transmission motor output speed when the estimated current power of the power source is less than the predetermined percent of the peak power of the power source.

15. A work machine, comprising:
a housing;
a traction device supporting the housing;
a power source operable to generate a power output, the power source having a desired operating range;
a transmission including a drive member operably engaged with the power source and a driven member operably connecting the transmission with the traction device, the transmission adapted to transmit the power output of the power source to the traction device; and
a control system in communication with the power source and the transmission, wherein the control system is operable to:
receive at least one input indicative of a load on the transmission, to identify a desired load of the transmission based on the at least one input;
receive at least one input indicative of a current power output of the power source;
limit desired transmission load applied to the driven member of the transmission based on the current power output of the power source to thereby prevent the power source from operating outside of the desired operating range;
sense a transmission motor output speed; and
determine a limiting motor command signal by comparing the current power source output power estimate with the current transmission output speed and a maximum acceptable speed droop or overspeed scaling factor.

16. The work machine as in claim 15, wherein the one or more inputs indicative of current power source performance include:
a power source speed signal;
a fuel setting signal; and
a fuel injection timing signal.

17. The work machine as in claim 15, wherein the transmission is a continuously variable transmission and the one or more inputs indicative of transmission loading include:
a transmission output speed; and
a transmission output torque.

* * * * *